(12) United States Patent
Yamazaki et al.

(10) Patent No.: US 6,368,692 B1
(45) Date of Patent: Apr. 9, 2002

(54) OPTICAL STORAGE MEDIUM

(75) Inventors: Mikio Yamazaki, Kanagawa;
Toshiyuki Kanno, Nagano, both of (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 09/411,447

(22) Filed: Oct. 1, 1999

(30) Foreign Application Priority Data

Oct. 8, 1998 (JP) .......................................... 10-286263

(51) Int. Cl.$^7$ ................................................ B32B 3/02
(52) U.S. Cl. .................... 428/64.1; 428/64.8; 430/270.2
(58) Field of Search ............................. 428/64.1, 64.4, 428/64.8, 457, 913; 430/270.14, 270.18, 270.2, 495.1, 945; 369/283, 288

(56) References Cited

U.S. PATENT DOCUMENTS 6,020,105 A * 2/2000 Wariishi .................. 430/270.2
6,071,672 A * 6/2000 Namba .................. 430/270.18
6,156,482 A * 12/2000 Hamada ................ 430/270.21

* cited by examiner

Primary Examiner—Elizabeth Evans
(74) Attorney, Agent, or Firm—Morrison Law Firm

(57) ABSTRACT

An optical storage medium that is compatible with a semiconductor laser having a beam with a short wavelength (i.e. between 500 and 700 nm), which includes a highly stable dye layer. The optical storage medium of the invention includes an optically transparent substrate having at least one major surface on which at least one groove is formed, a storage layer on the substrate and a metal reflection layer on the storage layer. The storage layer contains a composite consisting of from about 3 weight % to about 30 weight % of a metal complex compound and a cyanine dye. The cyanine dye absorbs light in the wavelength between 500 and 700 nm, and has an asymmetric molecular structure. The optical storage medium of the invention reduces jitter components in high density data storage and conforms to DVD specifications.

16 Claims, 14 Drawing Sheets

(III)

PRIOR ART

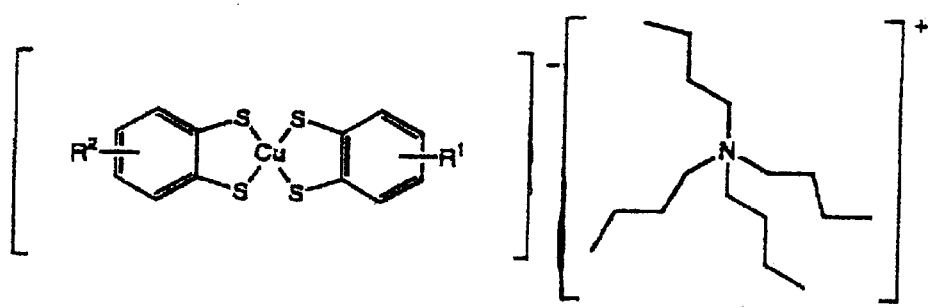

| Number of the structural formulas | Structures of the substituent $R^1$ | Structures of the substituent $R^2$ |
|---|---|---|
| I-1 | $-NO_2$ | $-NO_2$ |
| I-2 | $-COCH_3$ | $-NO_2$ |
| I-3 | $-COOH$ | $-NO_2$ |
| I-4 | $-COOCH_3$ | $-NO_2$ |
| I-5 | $-CHO$ | $-NO_2$ |
| I-6 | $-Cl$ | $-NO_2$ |
| I-7 | $-CN$ | $-NO_2$ |
| I-8 | $-NO_2$ | $-Br$ |
| I-9 | $-COCH_3$ | $-CN$ |
| I-10 | $-COOH$ | $-CN$ |
| I-11 | $-COOCH_3$ | $-CN$ |
| I-12 | $-CHO$ | $-CN$ |
| I-13 | $-Cl$ | $-CN$ |
| I-14 | $-CN$ | $-CN$ |
| I-15 | $-NO_2$ | $-I$ |
| I-16 | $-COCH_3$ | $-Cl$ |
| I-17 | $-COOH$ | $-Cl$ |
| I-18 | $-COOCH_3$ | $-Cl$ |
| I-19 | $-CHO$ | $-Cl$ |
| I-20 | $-Cl$ | $-Cl$ |
| I-21 | $-CN$ | $-Br$ |

| Number of the structural formulas | Structures of the substituent R¹ | Structures of the substituent R² |
|---|---|---|
| I-22 | -SPh | -SPh |
| I-23 | -COCH₃ | -SPh |
| I-24 | -COOH | -SPh |
| I-25 | -COOCH₃ | -SPh |
| I-26 | -CHO | -SPh |
| I-27 | -Cl | -SPh |
| I-28 | -CN | -SPh |
| I-29 | -NO₂ | -COOH |
| I-30 | -COCH₃ | -Br |
| I-31 | -COOH | -COOCH₃ |
| I-32 | -COOCH₃ | -COOCH₃ |
| I-33 | -CHO | -COOCH₃ |
| I-34 | -Cl | -COOH |
| I-35 | -CN | -COOH |
| I-36 | -NO₂ | -SO₂CH₃ |
| I-37 | -COCH₃ | -COOH |
| I-38 | -COOH | -CHO |
| I-39 | -COOCH₃ | -Br |
| I-40 | -CHO | -CHO |
| I-41 | -Cl | -SO₂NH₂ |
| I-42 | -CN | -OPh |

Fig. 13
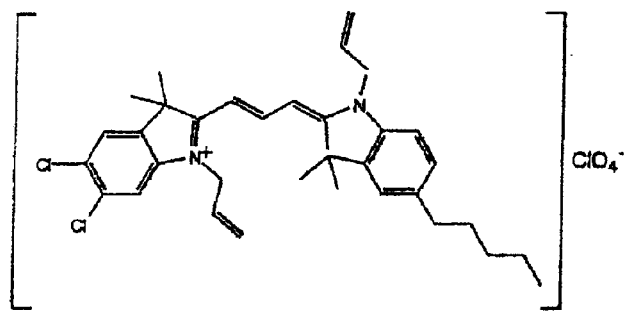
(II — 9)
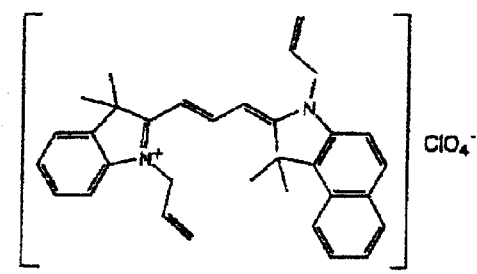
(II — 10)
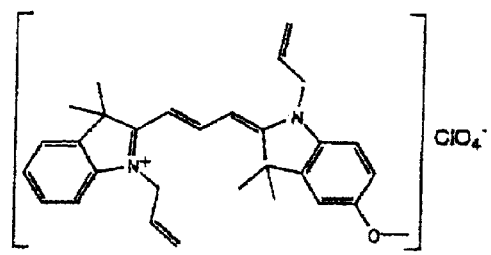
(II — 11)
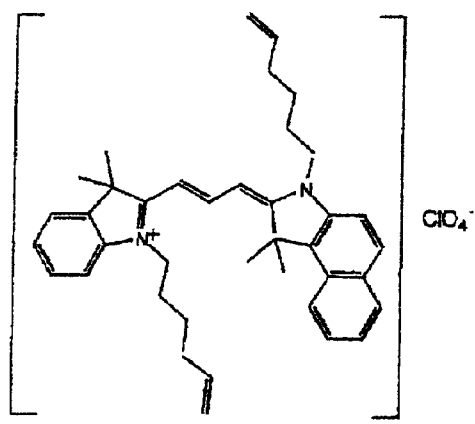
(II — 12)

Fig. 14
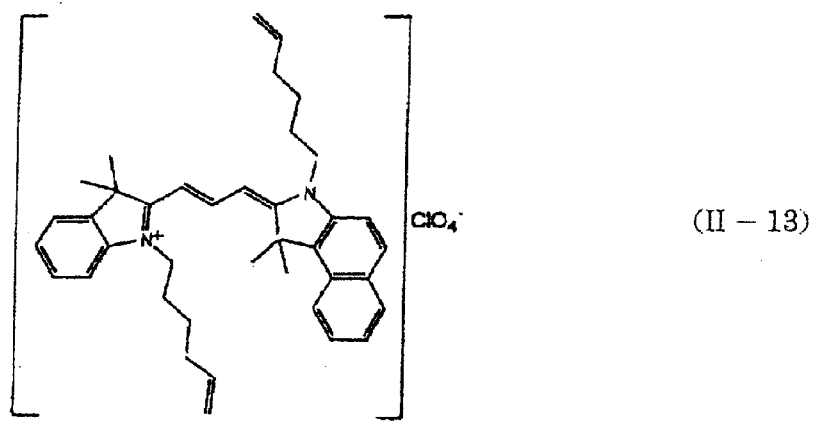
(II – 13)
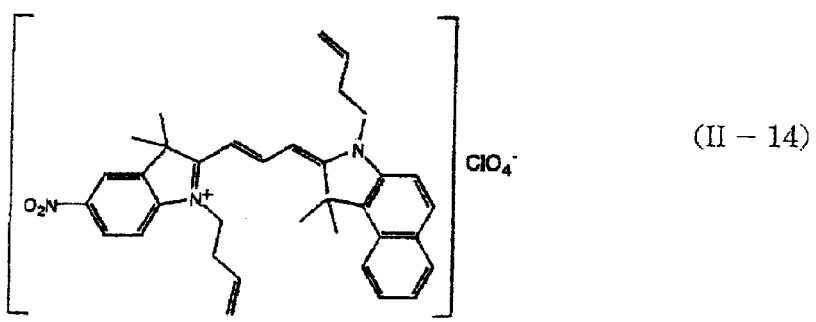
(II – 14)
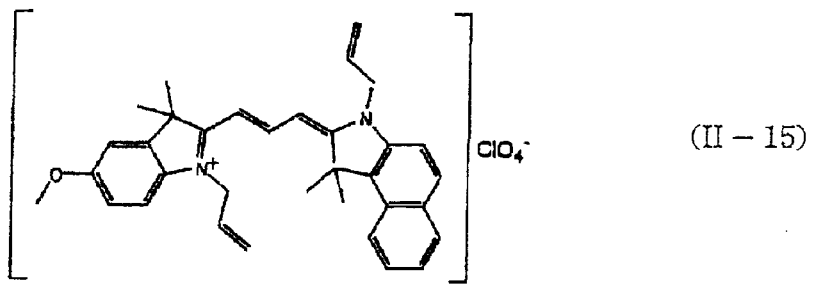
(II – 15)
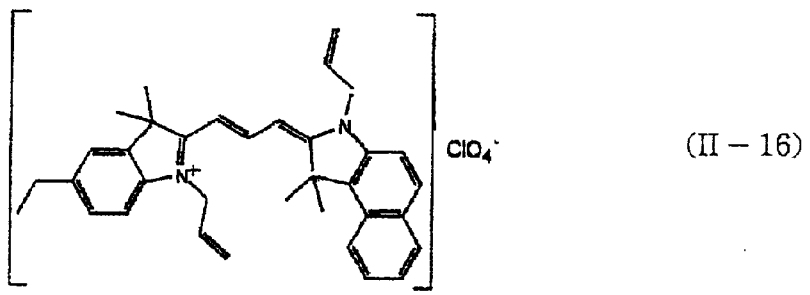
(II – 16)

Fig. 15
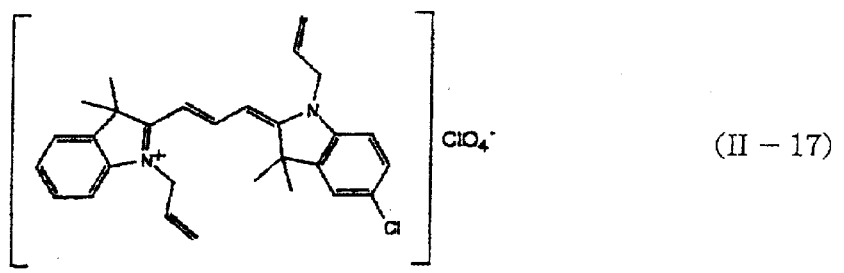
(II — 17)
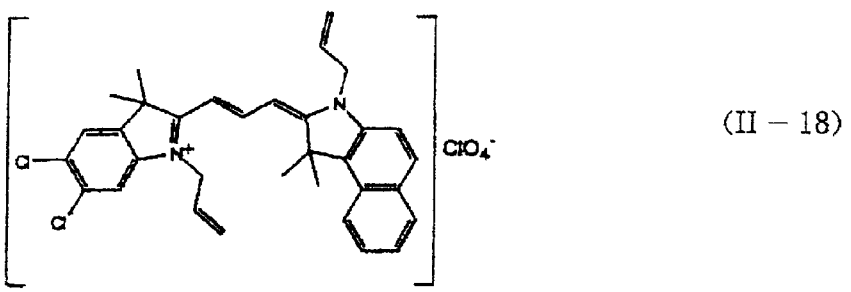
(II — 18)
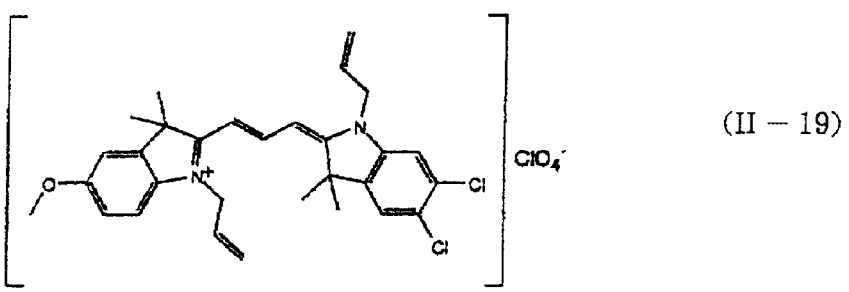
(II — 19)
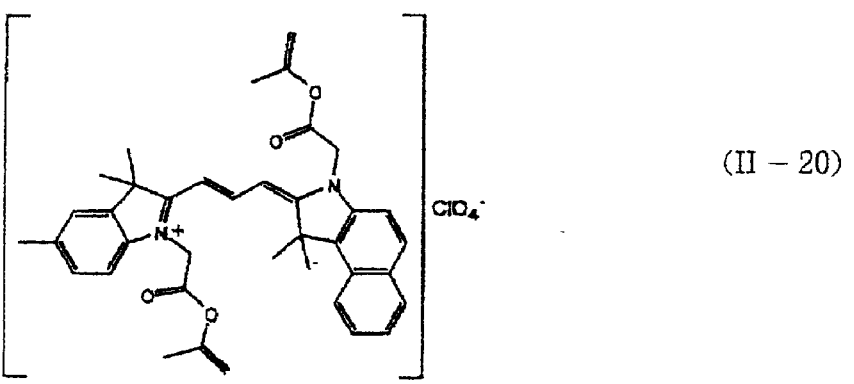
(II — 20)

Fig. 16
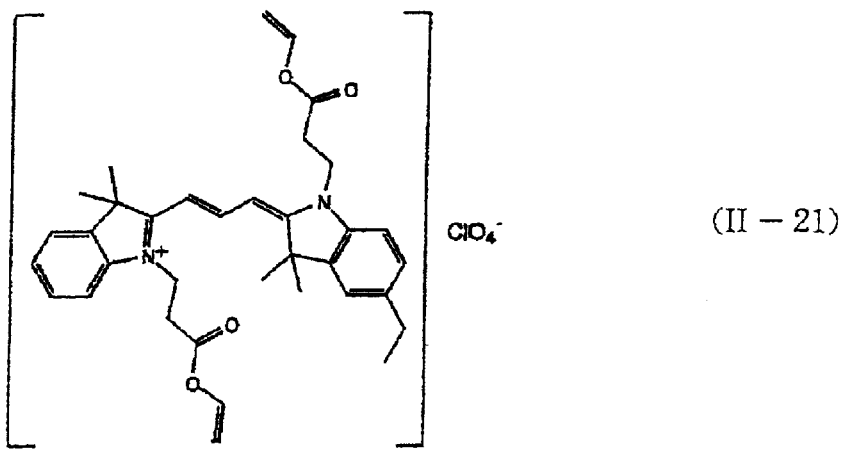
(II – 21)
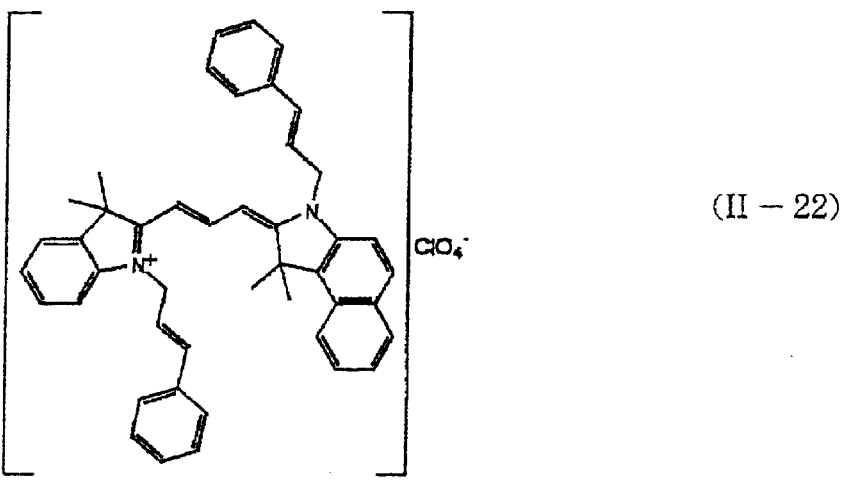
(II – 22)
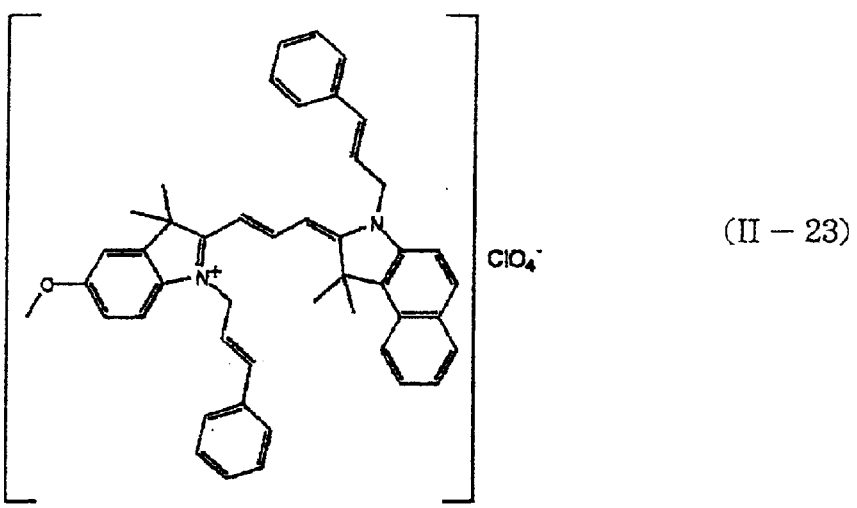
(II – 23)

(III – 1)

(IV – 1)

OPTICAL STORAGE MEDIUM

BACKGROUND OF THE INVENTION

The present invention relates to an optical storage medium, in which data is written and from which data is reproduced, using a laser beam. Specifically, the present invention relates to a write-once-type optical storage medium conforming to digital video disc (DVD) specifications. More specifically, the present invention relates to an optical storage medium that uses a highly sensitive and highly reliable organic dye thin film. High density data storage and data reproduction is achieved. The optical reflectance of the optical storage medium of the present invention, changes with irradiation of a writing light beam having a small beam diameter, making it particularly suited for high density data storage and for data reproduction.

Recordable optical storage media are in widespread use today. The optical storage medium is kept free from deterioration due to wear since the writing and reproducing head does not make contact with the storage medium. A large amount of data is stored in an optical storage medium by minimizing the diameter of the light beam for writing data. Many optical storage media have been developed and used for high-capacity data storage having these distinctive features. In making the optical storage media, a laser beam is focused onto a part of the storage layer of the optical storage medium, where the energy of the laser beam is converted to thermal energy. The properties and shape of the storage layer are changed by using thermal energy to melt, decompose and remove the irradiated part of the storage layer. As a result of this process, memory pits 6 which store the data are formed, as illustrated in FIGS. 1 through 3. The stored data is reproduced using the difference of the light quantities reflected between the portion where the data is stored and the portion where data is not stored.

At first, layers of tellurium (Te) and other such chalcogenide metals were developed for the storage layer. However, the chalcogenide metals are harmful to the human body. In addition, the dry method for forming the chalcogenide layers results in increased manufacturing costs. To avoid these disadvantages, and also to obtain high-density data storage, use of an organic dye as a main component of a storage layer in the storage media has been proposed. Although the optical reflectance of the organic dye storage layer is lower than that of the metal chalcogenide storage layer, the organic dye storage layer exhibits many merits. For instance, forming the organic dye storage layer by a wet method such as spin-coating results in lower manufacturing costs. In addition, the organic dye storage layer exhibits excellent resistance against acid and erosion. The organic dye storage layer facilitates local heating, which further facilitating the formation of clear and sharp memory pits. This effect is a result of the thermal conductivity of the organic dye storage layer being less than that of the chalcogenide metal storage layer.

Many structures for storage media have been proposed including the so-called air-sandwich structure which consists of a storage layer containing a conventional dye and an air layer on the storage layer. The structures thus formed facilitate obtaining signals reproduced in conformity with the compact disc (CD) specifications. These structures are described in Japanese Examined Patent Application No. H03-75943, Japanese Unexamined Laid Open Patent Applications No. H02-87341 and No. H05-67352, and Nikkei Electronics, No. 469 (Jan. 23., 1989), p107.

In a typical medium structure in conformity with the CD specifications, a light absorption layer containing an organic dye is formed on an optically transparent resin substrate. Hereinafter, the light absorption layer is sometimes referred to as the "organic dye layer." A light reflection layer, including for example Au, is formed directly onto the light absorption layer. Alternatively, a light reflection layer is formed indirectly above the light absorption layer with a hard layer interposed in between. A resin protection layer is formed on the light reflection layer. The light reflection layer is indispensable for providing the surface of the organic dye layer with the optical reflectance of 65% or more required to meet the CD specifications.

When a laser beam irradiates the optical storage media, the organic dye layer absorbs the laser beam and is melted or decomposed, and the substrate is softened. The dye and the substrate mix at the boundary between the organic dye layer and the substrate. As a result, the boundary is deformed, creating memory pits. The reflectance of the thus formed pit portions changes with the optical phase difference in the same way as in the CD's. The data is read out based on the reflectance change. The squalane dyes (disclosed in Japanese Unexamined Laid Open Patent Applications No. S56-46221, No. S63-218398, No. H01-178494, No. H05-139047 and No. H07-44904), the naphthoquinone dyes (disclosed in Japanese Unexamined Laid Open Patent Applications No. S61-290092, No. S62-432, No. S63-168201 and No. H05-139047), the azo dyes (disclosed in Japanese Unexamined Laid Open Patent Applications No. H07-161069, No. H07-251567 and No. H08-99467), the phthalocyanine dyes (disclosed in Japanese Unexamined Laid Open Patent Applications No. S57-82094, No. S57-82095, No. H07-156550, No. H07-16068, and No. H07-52544) and the cyanine dyes, having the general formula (III) described in FIG. 6, (disclosed in Japanese Unexamined Laid Open Patent Applications No. S59-24692, No. H02-87341, No. H06-320869, No. H06-338059, No. H06-199045, No. H07-262611 and No. S62-201288 and Japanese Examined Patent Application No. H07-4981) are used as the organic dye in the light absorption layer. The general formula (III) of the foregoing cyanine dyes is described in FIG. 6, where $R^{15}$ represents an alkyl group, an aryl group or an alkoxy group; $R^{16}$ an alkyl group, an aryl group or an alkoxy group; $Y^3$ a halogen atom, a hydrogen atom or a substituent such as an alkyl group, an alkoxy group, an aryl group, an alkoxysulfonyl group, a sulfonylalkyl group and a cyano group, and $Y^4$ a halogen atom, a hydrogen atom or a substituent such as an alkyl group, an alkoxy group, an aryl group, an alkoxysulfonyl group, a sulfonylalkyl group and a cyano group; $Q^1$ a sulfur atom, an oxygen atom, a selenium atom or a substituent such as an ethylene group; and $Q^2$ a sulfur atom, an oxygen atom, a selenium atom or a substituent such as an ethylene group.

Among the dyes described above, the cyanine dyes are primarily used due to their advantages including high sensitivity, high C/N ratio, excellent thermal properties and ease of layer formation. The cyanine dyes exhibiting high absorbance and reflectance in the wavelength from a semiconductor laser emitting a laser beam between 780 and 830 nm, are preferred for meeting CD specifications. One of the factors that determines the absorption wavelength of a molecule is the length of its π conjugated system. In the cyanine dye molecule, the π conjugated system absorbs light in the wavelength range between 780 and 830 nm. In the foregoing general formula (III), illustrated in FIG. 6, P represents the length of the ethylene chain in the central part of cyanine dye molecule. The value of P is generally 2. However, a dye as described in general formula (III) above, is not effective when a laser beam having a shorter wavelength is used to increase the storage density. Problems still remain concerning the deterioration of the optical storage media due to repeated reproduction, long term stability of the dye layer and C/N ratio.

A reduction of the C/N ratio and increase of the jitter components are caused by (i) deterioration and discoloration of the dye from heat accumulated in the storage layer due to prolonged exposure to the reading light, (ii) gradual melting and thermal deformation of the storage layer caused by the reading light on the boundaries for distinguishing the memory-pit portions from the non-memory-pit portions, (iii) oxidative deterioration (discoloration) of the dye by singlet oxygen generated by the energy transfer from the dye to oxygen in the environment while the dye is optically excited and (iv) a change in transparency of the cyanine dye caused by either natural light and oxygen contained in the dye or change of the transparency of the dye and noise caused by the association and aggregation of the dye molecules. This association and aggregation of the dye molecules is caused by exposure to oxygen and water molecules when the optical storage medium is stored for a long time. Although various proposals for solving the above described problems have been disclosed in Japanese Unexamined Laid Open Patent Applications No. S62-201288, No. S62-201289, No. S57-66541, No. S59-124894, No. S59-203247, No. S62-133173, No. S63-198096, No. S59-21339, No. S57-11090, No. S60-44389, No. S60-71296, No. S63-1594, No. H05-38879 and No. H07-262611 and Japanese Examined Patent Application No. H07-4981, the problems have not yet been solved.

Optical storage media have been developed for high density data storage which conform to the DVD-ROM specifications. These optical storage media increases the data storage density by using a beam from a semiconductor laser having a wavelength between 600 and 680 nm. This is shorter than the wavelength of the conventional laser beam for CD's. In addition, the optical storage media conforming to the DVD-ROM specifications use a smaller diameter of beam spot. Improvements of the cyanine dyes for CD's described by the general formula (III) illustrated in FIG. 6 have been made, and cyanine dyes for use at a shorter wavelength have been proposed (cf. Japanese Unexamined Laid Open Patent Applications No. H06-199045, No. H07-186530, No. H08-306074, No. H05-38879 and No. H06-40162).

OBJECTS AND SUMMARY OF THE INVENTION

Many problems remain unsolved when using organic dye layers in optical storage media, especially for DVD-ROM applications. For example, the sensitivity and the stability (reliability) of the organic dye layers developed so far, are not high enough at the desired wavelength. The S/N ratio and the C/N ratio are undesirably lower due to thermal interference between the adjacent pits in the high density data storage. Further, jitter in the reproducing signal is increased.

In view of the foregoing, it is an object of the invention to provide an optical storage medium that is compatible with a beam from a semiconductor laser having a short wavelength (i.e. between 500 and 700 nm).

It is another object of the invention to provide an optical storage medium that includes a highly stable dye layer.

It is still another object of the invention to provide an optical storage medium that facilitates reducing jitter components in high density data storage.

It is a further object of the invention to provide an optical storage medium that is in conformity with the DVD specifications.

Briefly stated, the present invention provides an optical storage medium including an optically transparent substrate having at least one major surface on which at least one groove is formed, a storage layer on the substrate and a metal reflection layer on the storage layer. The storage layer contains a composite consisting of from about 3 weight % to about 30 weight % of a metal complex compound and a cyanine dye. The cyanine dye has an asymmetrical structure and absorbs light in the wavelength between 500 and 700 nm.

BRIEF DESCRIPTION OF THE DRAWINGS

FIG. 9 describes the structural formulae (I-1) through (I-21) of Cu complex compounds used for the storage layer according to the present invention.

FIG. 13 describes the structural formulae (II-9) through (II-12) of cyanine dyes used for the storage layer according to the present invention.

FIG. 14 describes the structural formulae (II-13) through (II-16) of cyanine dyes used for the storage layer according to the present invention.

FIG. 15 describes the structural formulae (II-17) through (II-20) of cyanine dyes used for the storage layer according to the present invention.

FIG. 16 describes the structural formulae (II-21) through (II-23) of cyanine dyes used for the storage layer according to the present invention.

DETAILED DESCRIPTION OF THE INVENTION

Figure 1:
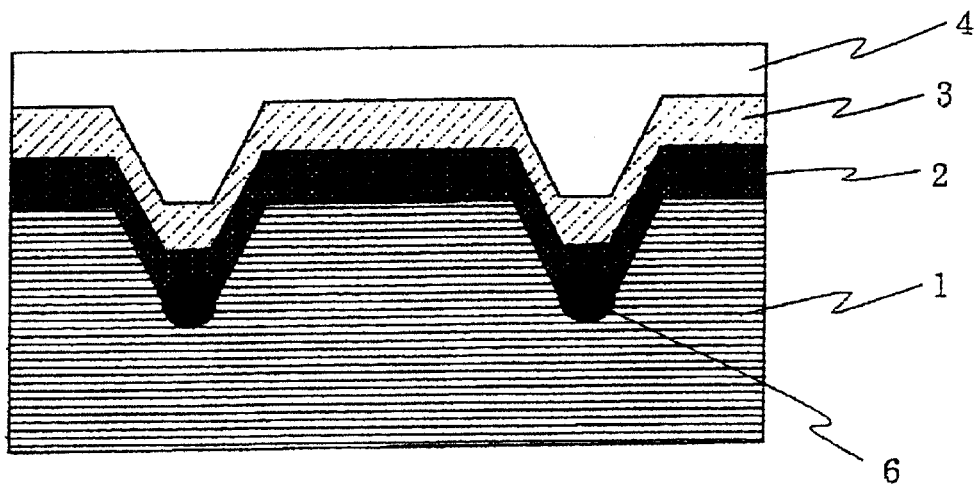
FIG. 1 is a schematic cross section of an optical storage medium according to an embodiment of the invention.

The inventors of the present invention have conducted intensive research and development to obviate the aforementioned problems. The inventors have found that these problems are obviated by a composite consisting of an asymmetric cyanine dye described by the general formula (II) in FIG. 8 and from 3 to 30 weight % of a metal complex compound described by the general formula (I) in FIG. 7, added to the cyanine dye as a singlet oxygen deactivator. The optical storage medium according to the invention is extremely sensitive for short wavelengths (from 500 to 700 nm), and is able to suppress deterioration from repeated reproduction for an extended period of time. In high density data storage, the optical storage medium of the present invention helps prevent thermal interference between adjacent memory pits and heat accumulation. The C/N ratio is improved and jitter components contained in the reproducing signals are reduced. That is, the optical storage medium according to the invention meets the DVD specifications.

According to an aspect of the invention, the present invention provides an optical storage medium including an optically transparent substrate having at least one major surface on which at least one groove is formed, a storage layer on one of the major surfaces of the substrate and a metal reflection layer on the storage layer. The storage layer contains a composite consisting of from about 3 to about 30 weight % of a metal complex compound described by the general formula (I) in FIG. 7 where $R^1$ and $R^2$ are each independently an electrophilic substituent. M is either a transition metal or a precious metal. M is capable of being in a trivalent oxidation state. $Z^-$ is an anion selected from the group consisting of $I^-$, $Br^-$, $ClO_4^-$, $BF_4^-$, $PF_4^-$, $SbF_4^-$, $CH_3SO_4^-$ and $H_3C-Ph-SO_3^-$. The balance of the composite is a cyanine dye described by the general formula (II) in FIG. 8 where $R^3$ and $R^4$ are each independently an alkenyl group having from 3 to 18 carbon atoms. $Y^1$ and $Y^2$ are each independently a hydrogen atom, an alkyl group, an aryl group, an alkoxy group, a halogen atom, a nitro group, a hydroxyl group, a $-OCF_3$ group, a $-R^5OH$ group, a $-R^6COOR^7$ group, a $-CH-CH-CN$ group, a $-COOR^8$ group, a residue forming or non-substituted naphthalene ring condensed with a benzene ring and a residue forming a non-substituted naphthalene ring condensed with a benzene ring. $R^1$ and $R^6$ are each independently an alkylene group having from 1 to 9 carbon atoms. $R^7$ and $R^8$ are each independently a hydrogen or an alkylene group having from 1 to 9 carbon atoms. The m is an integer from 1 to 4 and the n is an integer from 1 to 4. The cyanine dye absorbs light in the wavelength range between 500 and 700 nm. Either $R^3$ is not identical with $R^4$ or $(Y^1)_n$ is not identical with $(Y^2)_m$ in the general formula (II) such that the cyanine dye has an asymmetric molecular structure.

From about 3 to about 30 weight %, and more preferably from about 3 to about 15 weight %, of the metal complex compound described by the general formula (I) added to the organic dye storage layer deactivates the singlet oxygen yielded by light irradiation. It is thought that the added metal complex compound suppresses thermal energy accumulation in the organic dye molecules, by absorbing the near infrared light, thus improving the thermal stability and the chemical stability of the storage layer. An optical storage medium that is highly sensitive to the reading and writing light in the wavelength range between 500 and 700 nm, and is thermally and chemically stable, is obtained by combining the cyanine dye described by the general formula (II), having two unsaturated bonds in the methylene chain in the central part of the molecular structure, and alkenyl groups each having from 3 to 18 carbon atoms bonded to nitrogen atoms in the indole nuclei in both end portions of the molecular structure, with the metal complex compound described by the general formula (I). This cyanine dye further facilitates obtaining an optical storage medium that is highly sensitive to the reading and writing light in the wavelength range between 500 and 700 nm and is thermally and chemically stable.

Advantageously, either one or both of $R^3$ and $R^4$ have an ester bond, an unsaturated bond or a phenyl group. This cyanine dye further facilitates obtaining an optical storage medium that is much more sensitive to the reading and writing light in the wavelength range between 500 and 700 nm and much more thermally and chemically stable.

Advantageously, the metal reflection layer contains a metal selected from the group consisting of Al, Au, Ag, Cu, Ti, Ni and chalcogenide metals or an alloy of these metals, where the metal(s) exhibit optical reflectance of 55% or more for a laser beam having a wavelength between 500 and 700 nm. The metal reflection layer facilitates obtaining high optical reflectance for a reading light having a wavelength between 500 and 700 nm.

Advantageously, the optical storage medium further includes a protection layer on the metal reflection layer, such that a single-surface-type optical storage medium is formed, as illustrated in FIG. 1.

Figure 2:
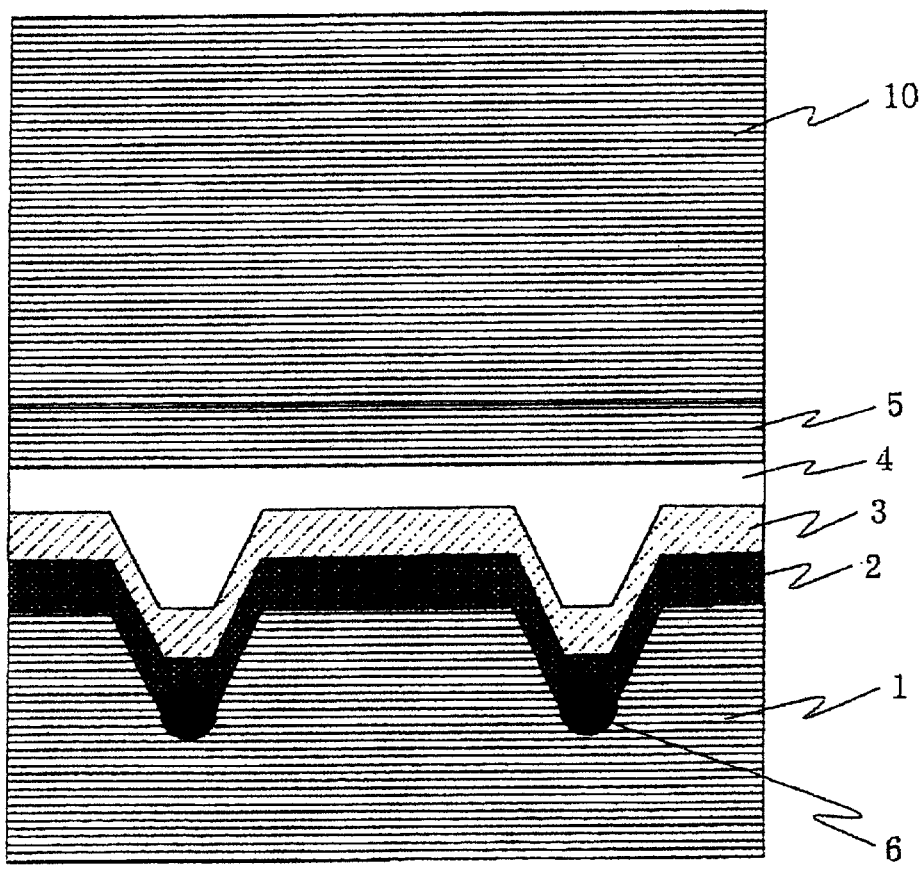
FIG. 2 is a schematic cross section of an optical storage medium according to another embodiment of the invention.

Advantageously, the optical storage medium further includes a protection layer on the metal reflection layer and a dummy substrate bonded onto the protection layer, such that a bonded and single-surface-type optical storage medium is formed, as illustrated in FIG. 2.

Figure 3:
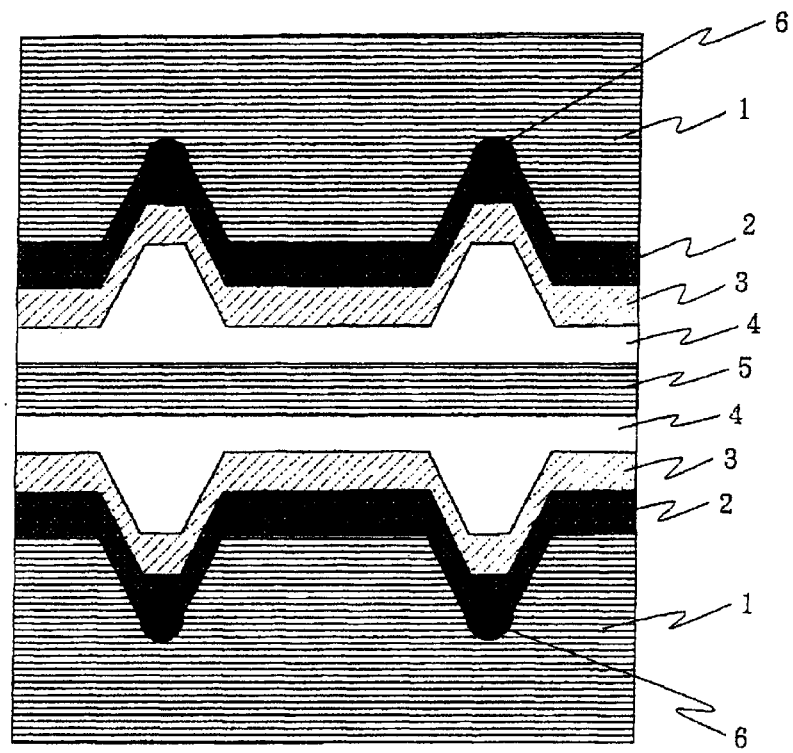
FIG. 3 is a schematic cross section of an optical storage medium according to still another embodiment of the invention.
Figure 7:
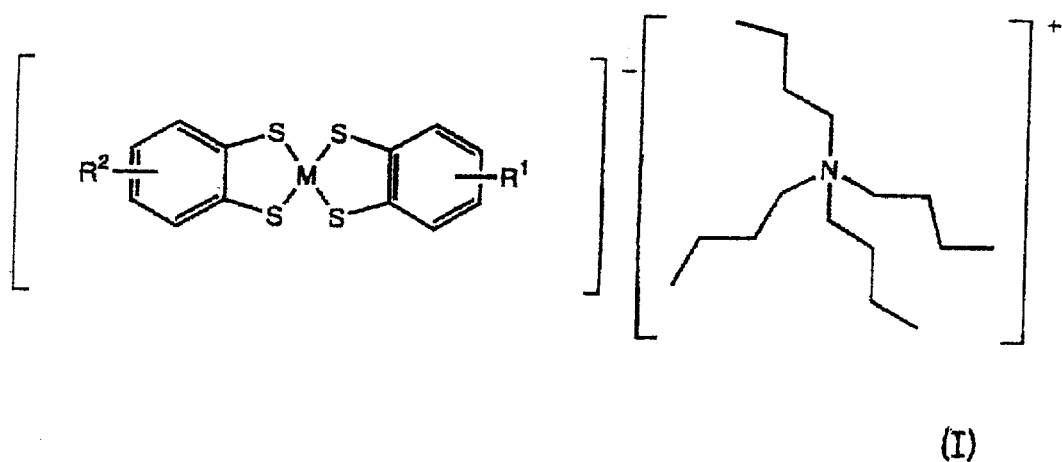
FIG. 7 describes the general formula (I) of the metal complex compounds used for the storage layer according to the present invention.
Figure 8:
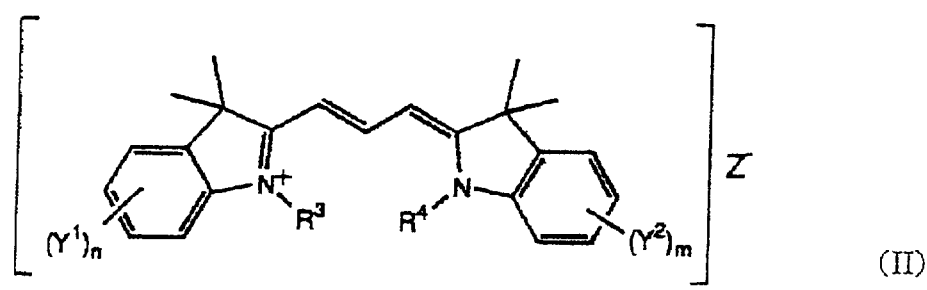
FIG. 8 describes the general formula (II) of the cyanine dyes used for the storage layer according to the present invention.

Advantageously, the optical storage medium further includes a first protection layer on the metal reflection layer, a second protection layer bonded onto the first protection layer, a second metal reflection layer on the second protection layer, a second storage layer on the second metal reflection layer and a second optically transparent substrate on the second storage layer, where the second storage layer contains from about 3 weight % to about 30 weight % of a metal complex compound described by the general formula (I) of FIG. 7 and the balance being of a cyanine dye described by the general formula (II) of FIG. 8 such that a bonded double-surface-type optical storage medium is formed. This bonded- and double-surface-type optical storage medium, as illustrated in FIG. 3, is manufactured by bonding the protection layers of two single-surface-type optical storage media together via an adhesive (bonding) layer.

Figure 4:
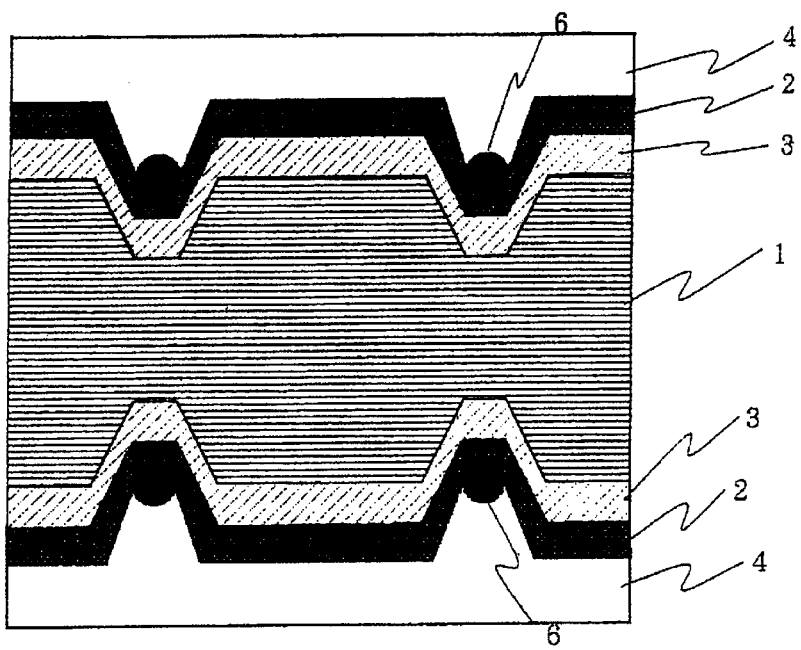
FIG. 4 is a schematic cross section of an optical storage medium according to a further embodiment of the invention.

Advantageously, the optical storage medium further includes a first protection layer on the metal reflection layer, a second storage layer on another major surface of the optically transparent substrate, a second metal reflection layer on the second storage layer, and a second protection layer on the second metal reflection layer, where the second storage layer contains from about 3 weight % to about 30 weight % of a metal complex compound described by the general formula (I) of FIG. 7 and a cyanine dye described by the general formula (II) of FIG. 8 such that a double-surface-type optical storage medium is formed. This double-surface-type optical storage medium, as illustrated in FIG. 4, is manufactured in the same fashion as the foregoing single-surface-type optical storage media.

FIG. 1 is a schematic cross section of an optical storage medium according to an embodiment of the invention. FIG. 2 is a schematic cross section of an optical storage medium according to another embodiment of the invention. FIG. 3 is a schematic cross section of an optical storage medium according to still another embodiment of the invention. FIG. 4 is a schematic cross section of an optical storage medium according to a further embodiment of the invention.

Referring now to these figures, the optical storage medium includes a substrate 1. The substrate 1 is shaped, for example, as a disc. Use of injection molding resins for the substrate 1 allow for greater productivity. Although there are no specific limitations for the resin of the substrate 1, thermoplastic resins such as polycarbonate resin, acrylic resin, polyester resin, amorphous olefin resin and methylpentene resin (TPX) are used, as they are readily molded and possess high optical transparency. Preferably, the resins exhibit optical transparency of 85% or more at the wavelengths of the writing laser beam and the reproducing laser beam, which are between 500 and 700 nm and, more specifically, between 600 and 680 nm.

Pre-pits or pre-grooves for tracking are either formed concentrically or helically in a major surface of the optical storage medium of a single-surface-type or of a bonded-type storage medium. The pre-pits or pre-grooves for tracking on the major surfaces of the optical storage medium in double-surfaces-type optical storage media are also formed concentrically or helically. In FIG. 2, the optical storage medium includes a dummy substrate 10, on which no storage layer 2, metal reflection layer 3 or protection layer 4 are formed.

In FIGS. 1 through 4, the laminate is from 1.0 to 1.5 mm thick. The laminate thickness is the total thickness of the substrate, storage layer, metal reflection layer and protection layer. In the bonded-type storage medium, two laminates, each from 0.5 to 0.65 mm thick, are bonded to each other. Pre-pits or pre-grooves are formed simultaneously in the two major surfaces of the double-surfaces-type storage medium.

All the illustrated optical storage media are from 54 to 120 mm in diameter. The tracking pitch in the substrate 1 is from 0.7 to 1.6 $\mu$m. The tracking groove is used for tracking control and for retaining the tracking data using the phase of the laser beam. The groove is preferably from 50 to 230 nm, and, more preferably from 70 to 200 nm in depth. When the groove is too shallow, the amount of deformation of the bottom surface of the groove, where data is stored, is not uniform, which causes increased jitter. When the groove is too deep, distortion of the reproducing signal tends to occur, since the deformation of the groove bottom surface reaches the metal reflection layer 3. The distortion of the reproducing signal further causes increased jitter and an insufficient degree of modulation. The increased jitter causes larger wavelength dependence of the reproducing and tracking signals. Therefore, it is necessary to optimize the depth and the shape of the grooves and the spectroscopic properties of the storage layer 2 with respect to the wavelength of the semiconductor laser beam used for high density data storage.

A storage layer 2 is formed on the substrate 1. An organic dye thin layer, that contains a composite of the metal complex compound described by the foregoing general formula (I) in FIG. 7, and the cyanine dye described by the foregoing general formula (II) in FIG. 8, is used for the storage layer 2. When a thin layer of the cyanine dye is added to the metal complex compound, the metal complex compound deposited in the thin layer exhibits absorption in the wavelength range between 800 and 1500 nm and absorbs the radiation in the near infrared region that acts as a heat source. The cyanine dye having an asymmetric molecular structure due to the asymmetric configuration of the substituents or the naphthalene rings bonded to two benzene rings in the indole nuclei, is preferred. Alternatively, a cyanine dye having ester bonds, unsaturated bonds or phenyl groups as the $R^3$ and $R^4$ substituents, is also preferred. A defect-free and uniform amorphous thin layer is obtained when the above described cyanine dyes are used for forming the storage layer. In addition, the thermal stability and the chemical stability of the storage layer structure are improved.

Figure 10:
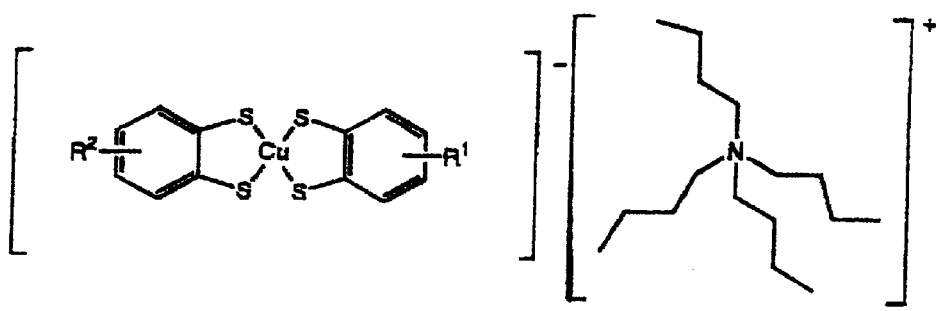
FIG. 10 describes the structural formulae (I-22) through (I-42) of Cu complex compounds used for the storage layer according to the present invention.
Figure 11:
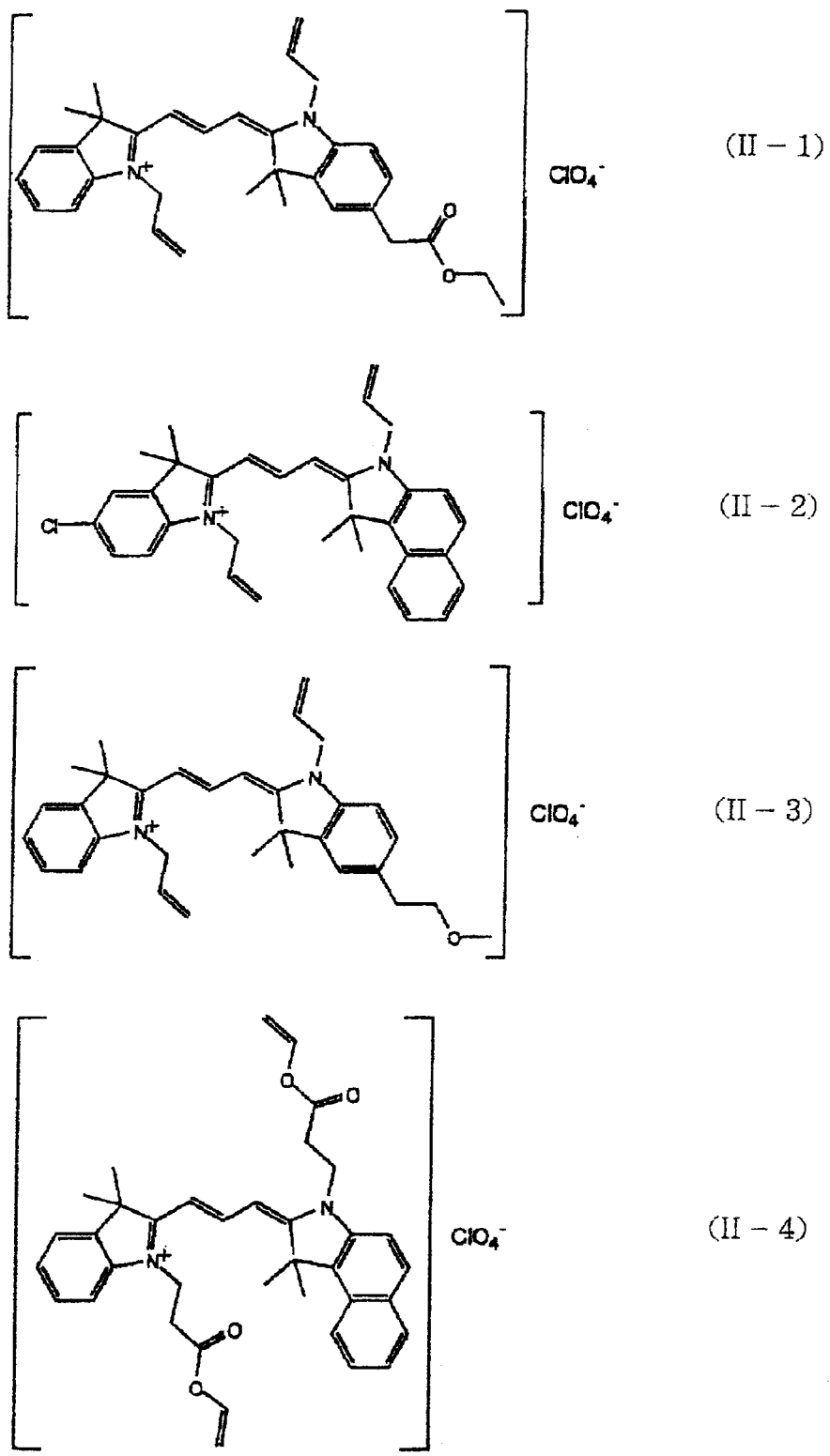
FIG. 11 describes the structural formulae (II-1) through (II-4) of cyanine dyes used for the storage layer according to the present invention.
Figure 12:
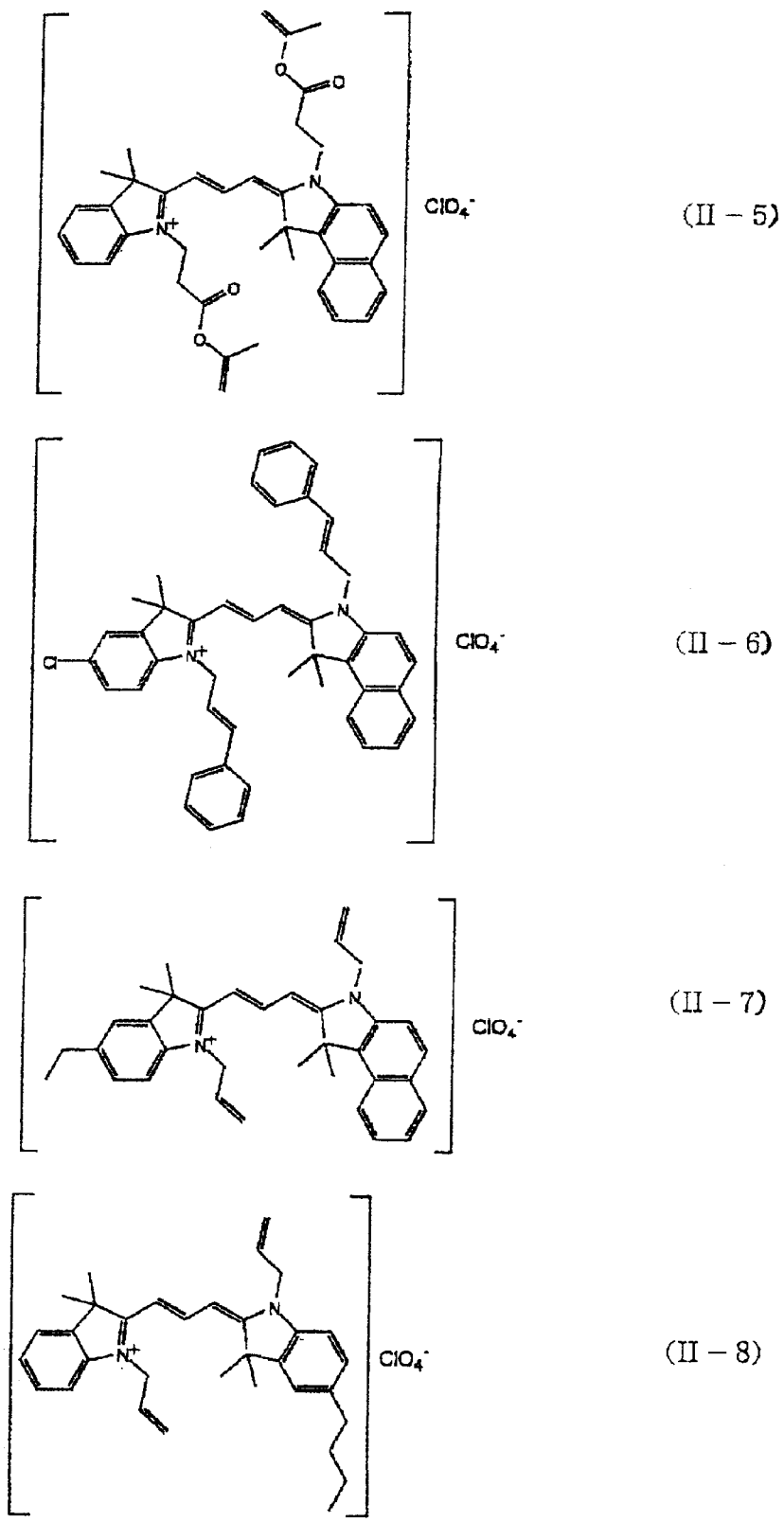
FIG. 12 describes the structural formulae (II-5) through (II-8) of cyanine dyes used for the storage layer according to the present invention.
Figure 17:
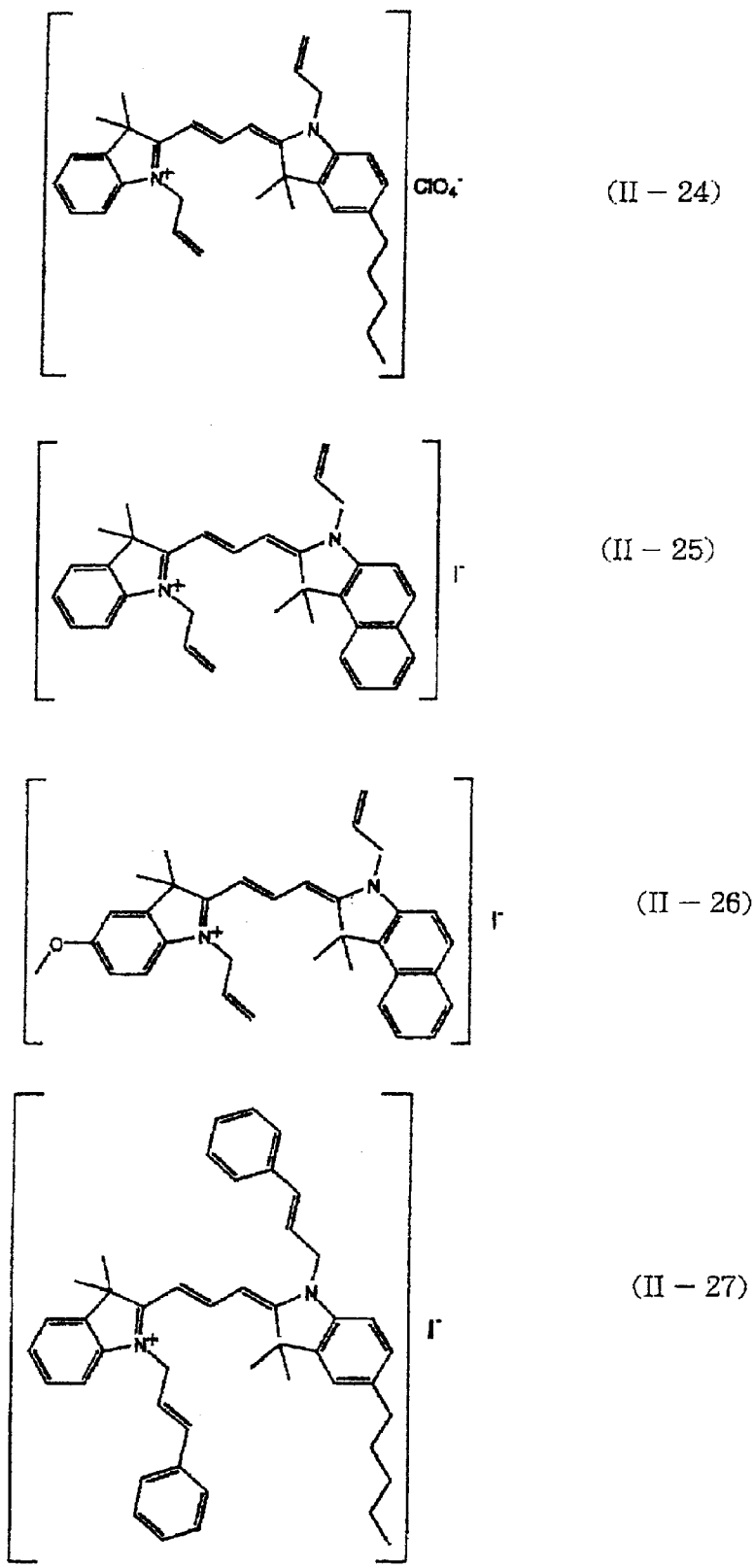
FIG. 17 describes the structural formulae (II-24) through (II-27) of cyanine dyes used for the storage layer according to the present invention.

The substituents $R^1$ and $R^2$ in the foregoing general formula (I) may have different structures or the same structure as long as they are electrophilic. The preferable substituents for $R^1$ and $R^2$ include —$NO_2$, —CN, —$COCH_3$, —COOH, —$COOCH_3$, —CHO, —I, —Br, —Cl, —F, —$SO_2CH_3$, —SPh, —OPh, —$CF_3$ and —$SO_2NH_2$. Metals such as Cu, Ni, Fe, Co, Zn, Cr, Mn, V, Ti, Au, Pt, Pd, and Rh may be used for the metal M in the general formula (I). These metal complex compounds (I) may be synthesized by the methods known to those skilled in the art (cf. R. Williams et al., J. Am. Chem. Sopc., 88, 43, (1966)). Examples of the metal complex compounds (I) are described in FIGS. 9 and 10.

The storage layer 2 contains preferably from about 3 to about 30 weight %, and, more preferably, from about 3 to about 15 weight % of the metal complex compound described by the general formula (I). When the storage layer 2 contains less than 3 weight % of the metal complex compound (I), the thermal stability and the photochemical stability of the storage layer are not improved. When the concentration of the metal complex compound (I) exceeds 30 weight %, the dye concentration in the storage layer 2 is too low to obtain sufficient sensitivity and the metal complex and dye tend to a separate from each other. Therefore, maintaining the concentration of the metal complex compound (I), within the range of between about 3 and about 15 weight % of the storage layer 2, is preferred.

The thin layer of the cyanine dye described by the formula (II) in FIG. 8 has an absorption wavelength and a reflection wavelength between 500 and 700 nm, exhibiting sufficient recording sensitivity and sufficient reproducing sensitivity at the desired wavelength of the laser beam (between 600 and 680 nm). The R3 and $R^4$ substituents in the general formula (II) include independently an allyl group, a vinyl group, an allylidene group, an allyloxy group, a crotonoyl group, a styryl group, a vinylidene group, a vinylene group, a methylidyne group, an acryloxy group, a methacryloxy group, an isopropenyl group, an ethynyl group or a butenyl group. These substituents are preferred since they form layers easily and have good affinity to the substrate surface. The number of carbon atoms in the $R^3$ and $R^4$ substituents is preferably from 3 to 18, and more preferably, from 3 to 9. The dye is prevented from association and aggregation by introducing $R^3$ and $R^4$ and/or by introducing $Y^1$ and $Y^2$ asymmetrically. By virtue of the effects described above, a stable and reliable storage layer 2 is obtained. The cyanine dyes described by the general formula (II) are synthesized by methods known to those skilled in the art (cf. U.S. Pat. No. 2,734,900 and U.S. Pat. No. 2,887,479). Examples of the cyanine dyes described by the general formula (II) are illustrated in FIGS. 11 through 17.

The cyanine compound described by the general formula (II) illustrated in FIG. 7, and the metal complex compound described by the general formula (I) illustrated in FIG. 8, are dissolved into a coating solvent that does not dissolve the substrate 1. Organic solvents such as methyl CELLOSOLVE, ethyl CELLOSOLVE, methanol, ethanol, isopropanol, diacetone alcohol, dimethylformamide, cyclohexanone, acetylacetone, tetrafluoropropanol, dichloroethane and dioxane are used for the coating solvent. The coating liquid thus prepared is usually deposited on the surface of the resin substrate 1 by spin-coating. This coating forms the storage layer in which a groove or grooves are formed.

The storage layer 2 is preferably from 50 to 500 nm and, more preferably, from 50 to 300 nm thick. When the storage layer 2 is less than 50 nm thick, the recording sensitivity and the optical reflectance are reduced, and ideal data storage is not achieved. When the storage layer 2 is more than 300 nm thick, a good tracking signal is not obtained and memory pits at times overlap. Memory pit overlap increases jitter, distorts the reproducing signal and increases cross talk. The thickness of the storage layer 2 is adjusted in light of the conditions for layer formation which obviate the aforementioned problems, the dye concentration and the shape of the groove.

A metal reflection layer 3 is formed on the storage layer 2. The metal reflection layer 3 is a thin layer of a metal such as Al, Au, Ag, Cu, Ni, Ti and of the metal reflection layer 3 is higher than that of the storage layer 2. The optical reflectance of the metal reflection layer 3 at the wavelength of the reading light is preferably at least 50%, and, more preferably, at least 60%. The metal reflection layer 3 is preferably from 30 to 150 nm thick, and more preferably, from 50 to 100 nm thick. The metal reflection layer 3 is formed by sputtering, vacuum deposition, ion plating and other such methods for film formation.

A protection layer 4 is formed on the metal reflection layer 3. The protection layer 4 is formed by coating an ultraviolet-ray-curing resin by spin-coating, spray-coating, gravure-coating and other coating methods known in the art. Next, the resin is cured by irradiating it with an ultraviolet ray. Epoxy resins, acrylic resins and silicone resins are used for the coating resin. The protection layer 4 may also be formed by bonding a resin sheet. These methods may also be used in forming the protection layers 4, 4 of the double-surfaces-type storage medium as shown in FIG. 3. The protection layers 4 in FIG. 3 may be also formed by depositing an inorganic material such as $Si_{-x}O_x$ using sputtering or vacuum deposition. A thin polymer film, formed by polymerizing monomers of parylene resin, polyamide resin or polyimide resin by vacuum-deposition-polymerization or by plasma-polymerization, may be also used for the protection layer 4. Preferably, the protection layer 4 is from 5 to 50 μm thick.

The optical storage media shown in FIGS. 2 and 3 include a bonding layer 5. The bonding layer 5 is a layer of an adhesive such as a hot-melt-type, an ultraviolet-ray-curing-type, a visible-light-curing-type or an adhesive tape. The bonded-type optical storage medium in FIG.3 uses two of its major surfaces for data storage and reproduction.

EMBODIMENTS

The present invention will be explained hereinafter in connection with preferred embodiments and comparative examples. The preferred embodiments and comparative examples described below use a polycarbonate substrate of 0.6 mm thick. The groove pitch is 0.75 μm.

First Embodiment (E1)

A powder mixture containing the cyanine dye described by the structural formula (II-2) and the metal complex compound described by the structural formula (I-5) at the weight mixing ratio of 9:1 is dissolved into a solvent mixture of ethyl CELLOSOLVE, ethanol and diacetone alcohol, at the weight mixing ratio of 5:3:2, using an ultrasonic wave. The weight mixing ratio of the powder mixture to the solvent mixture is 3 weight %. The solution is filtered. The filtered solution is coated on the foregoing substrate by spin-coating, resulting in a storage layer. The resulting storage layer is 60 nm thick. Then, aluminum is coated on the storage layer by sputtering, resulting in a metal reflection layer. The resulting metal reflection layer is 70 nm thick. Finally, a multifunctional epoxy acrylate paint of ultraviolet-ray-curing-type is coated on the metal reflection layer by spin-coating. The coated epoxy acrylate paint is cured, resulting in a protection layer. The resulting protection layer is 6 μm thick. Thus, a single-surface-type optical storage medium (E1) is fabricated.

A bonded type optical storage medium is fabricated by bonding the protection layers of two single-surface-type storage media using a hot-melt-type adhesive layer with hot pressing.

Second Embodiment (E2)

An optical storage medium (E2) for a second embodiment is fabricated in the same way as the optical storage medium (E1) of the first embodiment, except the metal complex compound described by the structural formula (I-13) is used.

Third Embodiment (E3)

An optical storage medium (E3) for a third embodiment is fabricated in the same way as the optical storage medium (E1) of the first embodiment, except the cyanine dye described by the structural formula (II-13) is used.

Fourth Embodiment (E4)

An optical storage medium (E4) for a fourth embodiment is fabricated in the same way as the optical storage media (E1) of the first embodiment, except a dye mixture containing the cyanine dye described by the structural formula (II-13) and the cyanine dye described by the structural formula (II-2) at a weight mixing ratio of 1:1 is used

Comparative Example 1 (C1)

An optical storage medium (E1) for comparative example 1 is fabricated in the same way as the optical storage media (E1) of the first embodiment, except the metal complex compound described by the structural formula (I-5) is not used.

Comparative Example 2 (C2)

An optical storage medium (C2) for comparative example 2 is fabricated in the same way as the optical storage medium (E4) of the fourth embodiment, except the metal complex compound described by the structural formula (I-5) is not used.

Comparative Example 3 (C3)

Figure 18:
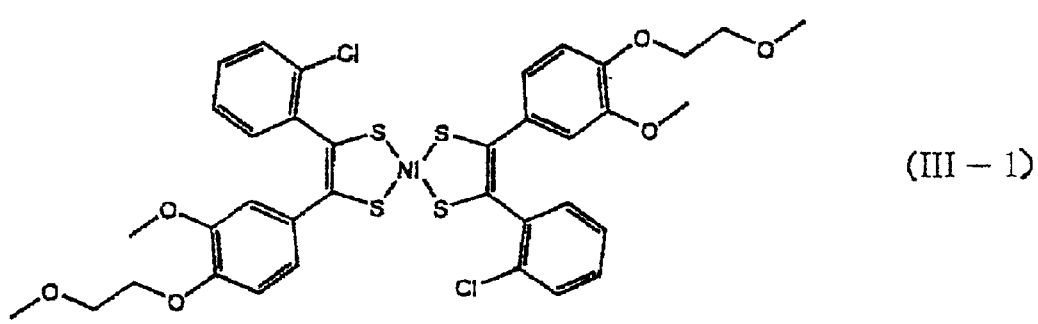
FIG. 18 describes the structural formula (III-1) of a Ni complex compound used for the storage layer.

An optical storage medium (C3) for comparative example 3 is fabricated in the same way as the optical storage medium (E1) of the first embodiment, except the Ni complex compound (NKX-1199 supplied from HAYASHIBARA BIOCHEMICAL LABORATORIES, INC., KANKOH-SHIKISO INSTITUTE) described by the structural formula (III-1) in FIG. 18 is used instead of the Cu complex compound described by the structural formula (I-5).

Comparative Example 4 (C4)

Figure 19:
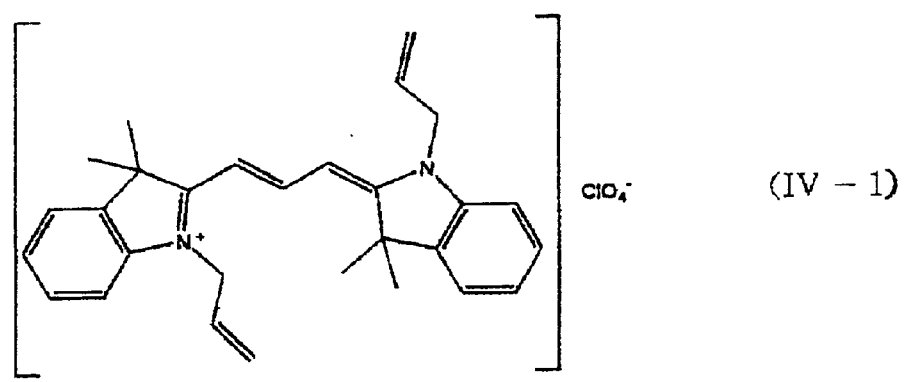
FIG. 19 describes the structural formula (IV-1) of a cyanine dye used for the storage layer.

Optical storage medium (C4) for comparative example 4 is fabricated in the same way as the optical storage medium (E1) of the first embodiment, except cyanine dye having a symmetric molecular structure described by the structural formula (IV-1) in FIG. 19 is used.

Comparative Example 5 (C5)

An optical storage medium (C5) of comparative example 5 is fabricated in the same way as the optical storage medium (E1) of the first embodiment, except a powder mixture containing the cyanine dye described by the structural formula (II-2) and the metal complex compound described by the structural formula (I-5) at a weight mixing ratio of 9.8:0.2 is used.

Comparative Example 6 (C6)

An optical storage medium (C6) of comparative example 6 is fabricated in the same way as the optical storage medium (E1) of the first embodiment, except a powder mixture containing the cyanine dye described by the structural formula (II-2) and the metal complex compound described by the structural formula (I-5) at a weight mixing ratio of 7:3 is used.

The optical reflectance values and the characteristics of the reproducing signals including C/N ratios and error rates of the optical storage media of the embodiments and the comparative examples are measured. Memory pits are recorded at the writing beam power of 7 mW on a disc. Reproducing signals are obtained from the memory pits by rotating the discs at the line speed of 3.3 m/s and by focusing a semiconductor laser beam through an objective lens onto the memory pits such that the beam diameter on the disc is 0.8 $\mu$m. The wavelength of the laser beam is 635 nm. The numerical aperture of the objective lens is 0.60. The reproducing signals from the memory pits are evaluated in an evaluating apparatus. A comparison is made of the initial reproducing signals, reproducing signals obtained after $1 \times 10^4$ times of reproductions (reproducing aging tests) and reproducing signals obtained after irradiating radiation from a metal halide lamp of 1500 W for 50 hr at the energy density of 30 mW/cm² at the surface of the media (accelerated light resistance tests). To evaluate the photochemical stability of the storage layers, specimens consisting of a polycarbonate substrate and a storage layer of 60 nm thick are fabricated. The storage media are exposed to the light irradiation conditions employed in the accelerated light resistance tests described above, to measure the decay of the optical absorbance at the absorption maximum of the storage layer, over time.

For all the specimens, the initial light reflectance values are 55% or more, the C/N ratios 52 dB or more, and the error rates $1 \times 10^{-5}$ or less. The half-decay times of the light absorbance of the storage layers fabricated according to the first through fourth embodiments are 50 hr or more under the light irradiation conditions employed in the accelerated light resistance tests described above. The half-decay times of the light absorbance of the storage layers fabricated according to the comparative examples 1 through 4 are around 20 hr. This result shows that the storage media layers of the comparative examples experience optical deterioration more readily than those of the present invention.

In comparative example 5, the concentration of the metal complex compound is too low to provide the storage layer with sufficient stability. In comparative example 6, defective reproducing signals occur, presumably due to phase separation of the metal complex compound from the composite.

Figure 5:
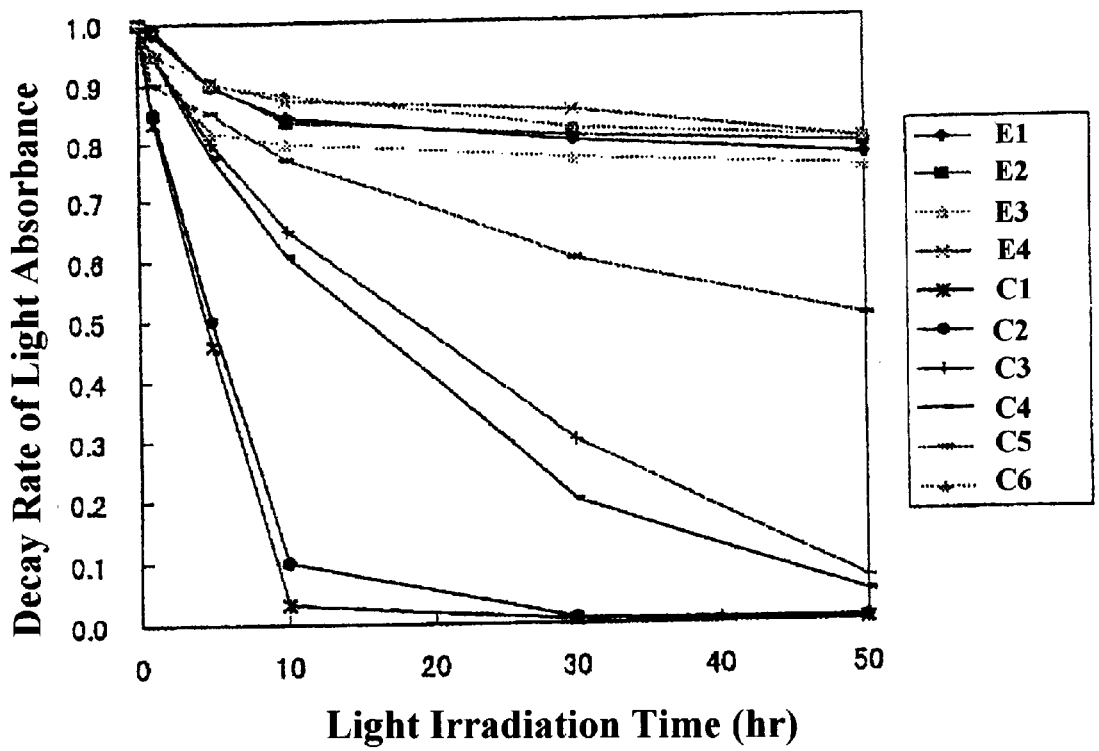
FIG. 5 is a set of curves relating the decay rate of the optical absorbance to the light irradiation period.
Figure 6:
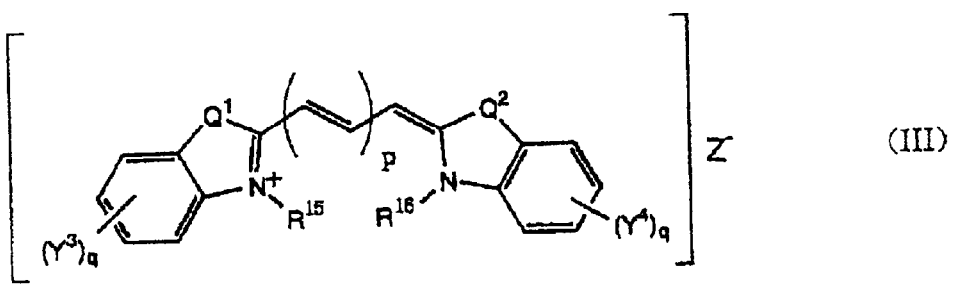
FIG. 6 describes the general formula (III) of cyanine dyes conventionally used for the storage layer.

Only when the metal complex compound of the present invention, is combined at an appropriate ratio with the cyanine dye of the present invention, are excellent writing and reading characteristics, photochemical stability and thermal stability, realized simultaneously. Table 1 lists the changing rates of the light reflectance and the error rates with respect to the initial values after the reproducing aging tests. Table 2 lists the changing rates of the light reflectance and the error rates with respect to the initial values after the accelerated light resistance tests. The decay rates of the light absorbance values at the absorption maximums are compared over time in FIG. 5.

TABLE 1

| Storage | Changing rates after $1 \times 10^4$ times of repeated reproduction (%) | |
| --- | --- | --- |
| Media | Optical reflectance | Error rates |
| E1 | 5 | 8 |
| E2 | 7 | 7 |
| E3 | 6 | 8 |
| E4 | 4 | 7 |
| C1 | Unmeasurable | Unmeasurable |
| C2 | 55 | 29 |
| C3 | 42 | 19 |
| C4 | 21 | 32 |
| C5 | 53 | 13 |
| C6 | 15 | 28 |

TABLE 2

| Storage | Changing rates after 30 hr of light irradiation (%) | |
| --- | --- | --- |
| Media | Optical reflectance | Error rates |
| E1 | 15 | 18 |
| E2 | 17 | 17 |
| E3 | 16 | 18 |
| E4 | 13 | 17 |
| C1 | 91 | Unmeasurable |
| C2 | 66 | 53 |
| C3 | 34 | 28 |
| C4 | 42 | 33 |
| C5 | 32 | 25 |
| C6 | 15 | 34 |

Use of a storage media composite consisting of the cyanine dye of the present invention having a molecular structure described by the general formula (II), and from 3 to weight 30% of the metal complex compound described by the general formula (I), avoids optical deterioration. In addition, the thermal stability and the photochemical stability of the storage layer are improved. An optical storage medium, that exhibits sufficient sensitivity and reflectance for reading and writing operations by using a 500 to 700 nm semiconductor laser beam, is obtained by using the storage media composite of the present invention in a storage layer. Only minimal deterioration of the optical storage media occurs after repeated reproduction when using the storage medium of the present invention. Long term data retention and reliability are achieved. The optical storage medium of the present invention helps prevent thermal interference between the adjacent memory pits and heat accumulation from causing deterioration and discoloration of the dye and other undesirable effects. When the present invention is used the C/N ratio of the optical storage medium is high. Thus, the optical storage medium of the present invention conforms to DVD specifications.

The optical storage medium of the present invention includes a reflection layer of a chalcogenide metal. Preferred metals are selected from Al, Au, Ag, Cu, Ti, Ni or a reflection layer of an alloy of these metals. The reflection layer facilitates realizing high optical reflectance in the wavelength range between 500 and 700 nm and optically storing data with high sensitivity.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An optical storage medium comprising:
   an optically transparent substrate having at least one major surface and having at least one grove formed in said at least one major surface;
   a storage layer on one of said at least one major surface of said substrate;
   a metal reflection layer on said storage layer;
   said storage layer containing from about 3 weight % to about 30 weight % of a metal complex compound described by the following general formula (I):

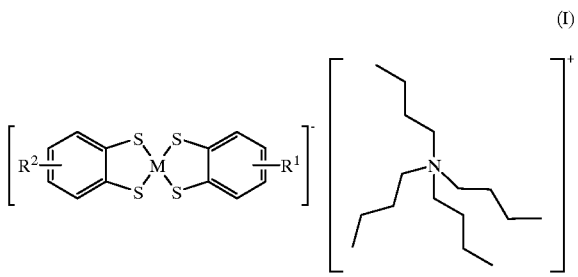

(I)

wherein $R^1$ and $R^2$ are each independently an electrophilic substituent;
M is a metal selected from the group consisting of a transition metal and a precious metal;
said metal being capable of being in a trivalent oxidation state;
said storage layer containing cyanine dye described by the following general formula (II):

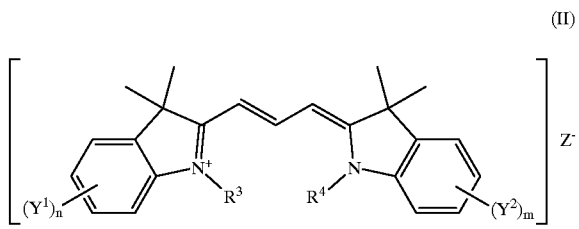

(II)

wherein $Z^-$ is an anion;
$R^3$ and $R^4$ are each independently an alkenyl group;
$Y^1$ and $Y^2$ are each independently selected from the group consisting of a hydrogen atom, an alkyl group, an aryl group, an alkoxy group, a halogen atom, a nitro group, a hydroxyl group, a —$OCF_3$ group, a —$R^5OH$ group, a —$R^6COOR^7$ group, a —CH=CH—CN group, a —$COOR^8$ group, and a substituted or non-substituted fused benzene ring;
said $R^5$ and said $R^6$ are each independently an alkylene group having from 1 to 9 carbon atoms;
said $R^7$ and said $R^8$ are each independently a hydrogen atom or an alkyl group having from 1 to 9 carbon atoms;
n is an integer from 1 to 4;
m is an integer from 1 to 4;
provided that when said $R^3$ is equal to said $R^4$ then said $(Y^1)_n$ is not equal to $(Y^2)_m$ and provided that when said $(Y^1)_n$ is equal to said $(Y^2)_m$ then said $R^3$ is not equal to said $R^4$; and
said cyanine dye absorbs light in the wavelength of between 500 nm and 700 nm.

2. The optical storage medium according to claim 1, wherein said storage layer contains from about 3 weight % to about 15 weight % of said cyanine dye;
said anion is selected from the group consisting of $I^-$, $Br^-$, $ClO_4^-$, $BF_4^-$, $PF_4^-$, $SbF_4^-$, $CH_3SO_4^-$ and $H_3C$—Ph—$SO_3^-$;
said $R^1$ and said $R^2$ are each independently selected from the group consisting of —$NO_2$, —CN, —$COCH_3$, —COOH, —$COOCH_3$, —CHO, —I, —Br, —Cl, —F, —$SO_2CH_3$, —SPh, —OPh, —$CF_3$ and —$SO_2NH_2$; and
said $R^3$ and said $R^4$ are each independently an alkenyl group having from 3 to 18 carbon atoms.

3. The optical storage medium according to claim 2, wherein said $R^3$ and said $R^4$ are each independently an alkenyl group having from 3 to 9 carbon atoms.

4. The optical storage medium according to claim 1, wherein said $R^3$ and said $R^4$ are each independently selected from the group consisting of a hydrogen atom an ester bond, an unsaturated bond and a phenyl group.

5. The optical storage medium according to claim 2, wherein said $R^3$ and said $R^4$ are each independently selected from the group consisting of a hydrogen atom an ester bond, an unsaturated bond and a phenyl group.

6. The optical storage medium according to claim 3, wherein said $R^3$ and said $R^4$ are each independently selected from the group consisting of a hydrogen atom an ester bond, an unsaturated bond and a phenyl group.

7. The optical storage medium according to claim 6, wherein said anion is selected from the group consisting of $I^-$, $Br^-$, $ClO_4^-$, $BF_4^-$, $PF_4^-$, $SbF_4^-$, $CH_3SO_4^-$ and $H_3C$—Ph—$SO_3^-$; and
$R^1$ and $R^2$ are each independently selected from the group consisting of —$NO_2$, —CN, —$COCH_3$, —COOH, —$COOCH_3$, —CHO, —I, —Br, —Cl, —F, —$SO_2CH_3$, —SPh, —OPh, —$CF_3$ and —$SO_2NH_2$.

8. The optical storage medium according to claim 1, wherein said metal reflection layer comprises a metal exhibiting an optical reflectance of 55% or more for the laser beam having a wavelength between 500 nm and 700 $\mu$m.

9. The optical storage medium according to claim 8, wherein said metal reflection layer comprises at least one metal selected from the group consisting of Al, Au, Ag, Cu, Ti, Ni and a chalcogenide metal.

10. The optical storage medium according to claim 1, further comprising a protection layer on said metal reflection layer.

11. The optical storage medium according to claim 10, further comprising a second optically transparent substrate bonded onto said protection layer.

12. The optical storage medium according to claim 1, further comprising:
   a first protection layer on said metal reflection layer;
   a second protection layer bonded onto said first protection layer;
   a second metal reflection layer on said second protection layer;
   a second storage layer on said second metal reflection layer;
   a second optically transparent substrate on said second storage layer; and
   said second storage layer containing from about 3 weight % to about 30 weight % of a metal complex compound described by said general formula (I) and a cyanine dye described by said general formula (II).

13. The optical storage medium according to claim 12, wherein said metal reflection layer includes a metal selected from the group consisting of at least one of Al, Au, Ag, Cu, Ti, Ni and a chalcogenide metal; and said metal exhibits an optical reflectance of at least 55% for a laser beam having a wavelength between 500 nm and 700 nm.

14. The optical storage medium according to claim 1, further comprising a first protection layer on said metal reflection layer, a second storage layer on a second of said at least one major surface of said optically transparent substrate;

a second metal reflection layer on said second storage layer, and a second protection layer on said second metal reflection layer; and said second storage layer containing from about 3 weight % to about 30 weight % of a metal complex compound described by said general formula (I) and a cyanine dye described by said general formula (II).

15. The optical storage medium according to claim 14, wherein said second metal reflection layer includes at least one metal selected from the group consisting of at least one of Al, Au, Ag, Cu, Ti, Ni and a chalcogenide metal; and said metal exhibits an optical reflectance of at least 55% for a laser beam having a wavelength between 500 nm and 700 nm.

16. The optical storage medium according to claim 1, further comprising:

a first protective layer on said metal reflection layer;

a second protection layer bonded onto said first protection layer;

a second metal reflection layer on said second protection layer;

a second storage layer on said second metal reflection layer;

said second storage layer comprising from about 3 weight % to about 30 weight % of said metal complex compound described by said general formula (I) and said cyanine dye described by said general formula (II); and a second substrate on said second storage layer.

* * * * *